United States Patent [19]

Endo et al.

[11] Patent Number: 4,966,384
[45] Date of Patent: Oct. 30, 1990

[54] SUSPENSION MEMBER MOUNTING STRUCTURE

[75] Inventors: Terumasa Endo, Nagoya; Hiroshi Naruse, Toyota; Hideo Nagaya, Toyota; Hideaki Tsushima, Toyota; Isamu Koyama, Toyota; Yoji Matsumoto, Okazaki, all of Japan

[73] Assignee: Toyota Jidosha Kabushiki Kaisha, Japan

[21] Appl. No.: 346,463

[22] Filed: May 2, 1989

[30] Foreign Application Priority Data

May 8, 1988 [JP] Japan .................................. 63-60749

[51] Int. Cl.$^5$ ...................... B60G 13/00; B60G 11/10
[52] U.S. Cl. .................................. 280/688; 280/660; 280/716
[58] Field of Search ............... 280/688, 689, 690, 697, 280/701, 715, 724, 660, 716

[56] References Cited

U.S. PATENT DOCUMENTS

| | | | |
|---|---|---|---|
| 4,341,397 | 7/1982 | Morimura et al. | 280/688 |
| 4,466,636 | 8/1984 | Cornacchia et al. | 280/688 |
| 4,565,389 | 1/1986 | Kami et al. | 280/688 |

FOREIGN PATENT DOCUMENTS

| | | | |
|---|---|---|---|
| 55508 | 4/1985 | Japan | . |
| 59108 | 4/1986 | Japan | . |

Primary Examiner—Richard A. Bertsch
Attorney, Agent, or Firm—Oliff & Berridge

[57] ABSTRACT

A suspension member mounting structure for mounting on a vehicle body a suspension member, with which left and right suspension arms each supporting a wheel are connected, through a front cushion group and a rear cushion group. The front cushion group has two cushion mounts attached to two positions of the suspension member in front of a rotary axis of the wheels and the rear cushion group has two cushion mounts attached to two positions of the suspension member behind the rotary axis of the wheels. Each cushion mount of the front cushion group is disposed to have a hole first, through which a bolt extends, extending vertically of the vehicle body and each cushion mount of the rear cushion group is disposed to have a second hole, through which a bolt extends, extending longitudinally of the vehicle body.

8 Claims, 8 Drawing Sheets

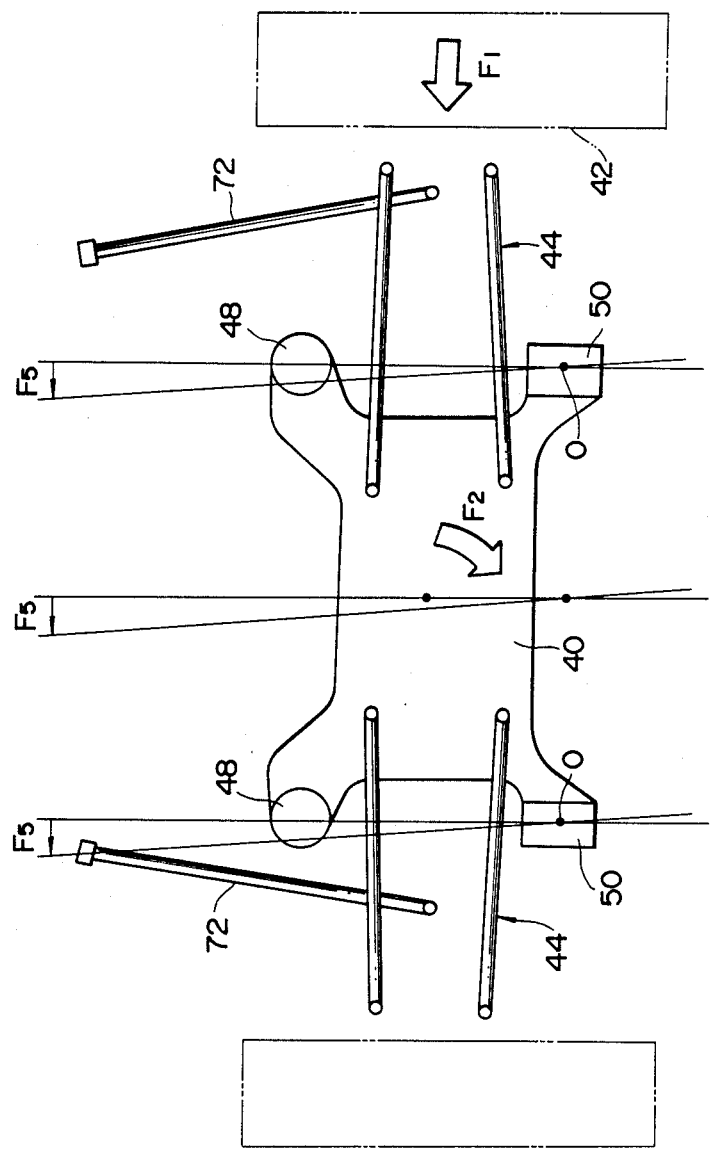

SUSPENSION MEMBER MOUNTING STRUCTURE

BACKGROUND OF THE INVENTION

1. Field of the Invention:

This invention relates to a structure for mounting on a vehicle body a suspension member, with which a suspension arm and other parts of a suspension of a vehicle are connected.

2. Description of the Prior Art:

There is the case where a suspension member, with which a suspension arm and other parts constituting a suspension of a vehicle are connected, is mounted on a vehicle body through cushion mounts disposed in predetermined positions (for example, Japanese Utility Model Public disclosure (KOKAI) No. 61-59108).

The suspension member as noted above is formed into an approximately rectangular or H-shaped contour in plan, as shown in FIGS. 9 and 10, which is connected to a vehicle body 21 on four corners, or formed into an approximately triangular shape in plan, as shown in FIGS. 11 and 12, which is connected to the vehicle body 21 on three corners.

In the suspension member 20 shown in FIGS. 9 and 10, left and right suspension arms 26, 28 each supporting a wheel 24 are connected with both sides of the suspension member 20. The suspension member 20, with which the suspension arms are connected, is mounted to the vehicle body 21 through two cushion mounts 30 on two corners in front of a rotary axis of wheels 24 and through two cushion mounts 32 on two corners in the rear of the rotary axis of the wheels 24.

In the suspension member 22 shown in FIG. 11, the left and right suspension arms 26, 28 each supporting a wheel 24 are connected with both sides of the suspension member 22. The suspension member 22, with which the suspension arms are connected, is mounted to the vehicle body 21 on one corner in front of a rotary axis of the wheels 24 through one cushion mount 30 and on two corners in the rear of the rotary axis of the wheels 24 through two cushion mounts 32. The suspension member 22 shown in FIG. 12 is mounted to the vehicle body 21 on two corners in front of the rotary axis of the wheels 24 through two cushion mounts 30 and on one corner in the rear of the rotary axis of the wheels 24 through one cushion mount 32.

In either of the suspension members as noted above, each cushion mount is made of rubber into the form of a cylinder and disposed so as to extend an axis thereof in a vertical direction of the vehicle body. Thus, the suspension member is mounted to the vehicle body by bolts and other connecting means extending vertically through the cushion mounts.

When a vehicle, on which the suspension member as noted above is mounted, travels, as shown in FIGS. 9-12, lateral force $F_1$, yawing force $F_2$ intending to move the vehicle body around a vertical line passing through the center of gravity of the vehicle, longitudinal force $F_3$ such as driving force or braking force, vertical force $F_4$ due to the action of a differential gear or the like and other forces act on the suspension member and further act on the cushion mounts attached to the suspension member.

Now, each of the cushion mounts of the vehicle should be set to ensure controllability, while reducing noises and vibrations so as to maintain satisfactory ride comfort. Generally, it is assumed that the spring constants or rigidities of the cushion mount in the longitudinal and vertical directions of the vehicle are preferably set to be small from a view point of improving the ride comfort and the rigidity in the left and right directions (lateral direction) is preferably set to be large from a view point of ensuring the controllability.

Then, in the cushion mount 30(32) having the axis set in the vertical direction of the vehicle, as shown in FIG. 8, for example, a pair of slots 31b are provided to sandwich a central hole 31a formed in the cylindrical rubber, while a pair of inserts 31d made of hard material are embedded in a columnar portion 31c having no slot to form the cushion mount. The cushion mount is attached to the suspension member such that the pair of slots 31b are located longitudinally of the vehicle body and the suspension member is mounted to the vehicle body by a bolt extending vertically through the hole 31a.

When the suspension member receives the yawing force or torsional force in turning, the columnar portion 31c of the cushion mount is displaced in substantially longitudinal direction orthogonal to the axis thereof depending upon the amount of force thus received, so that it is liable to occur the buckling of the cushion mount by the lateral force and the rigidity in the lateral direction may be abruptly reduced. In order to cope with this while the lateral rigidity of the cushion mount has to be increased correspondingly in consideration of the rigidity reduction, the increase of the lateral rigidity is limited merely by the method of providing the inserts. Thus, the rigidity of rubber itself needs to be increased. However, the increase of the rigidity of rubber itself increases necessarily the longitudinal rigidity to thereby degrade the ride comfort.

All cushion mounts of the suspension member are considered to be disposed with the axes of the cushion mounts being directed longitudinally as disclosed in Japanese Utility Model Public Disclosure (KOKAI) No. 60-55508 for example. When the suspension member having the cushion mounts disposed in this manner receives the yawing force or torsional force in turning, the columnar portion of the cushion mount is subjected to the axial shear deformation while this columnar portion is not displaced in the vertical direction orthogonal to the axis. Accordingly, the reduction of the lateral rigidity of each cushion mount produced in the case where the cushion mounts are disposed with the axes directed vertically does not occur. In addition, it has been confirmed by inventors that when longitudinal shear deformation occurred in a cushion mount having the axis disposed longitudinally, the lateral rigidity of the cushion mount is increased, compared with that prior to occurrence of the shear deformation.

As mentioned above, when the cushion mount with upper and lower slots has the axis disposed longitudinally of the vehicle body, the lateral rigidity is not positively reduced by occurrence of the buckling of the columnar portion in turning and, on the contrary, the lateral rigidity is effectively increased, so that such disposition of the cushion mount is preferable to improve the controllability. On the other hand, as described in Public disclosure as noted above, in all cushion mounts having the respective axes disposed longitudinally, a load on the vehicle body acts always vertically on the cushion mounts. Therefore, when the slots are provided only in the upper and lower portions of each cushion mount and the load on the vehicle body is supported with the shear deformation of the columnar portion, the cushion mount is degraded in durability. Then, it is necessary that compressive deformation regions are provided in the connections between the columnar portion and a peripheral annular portion of the cushion mount to ensure the durability. However, by providing the compressive deformation regions, the vertical rigidity is increased and thus the function of compensating for the degradation of ride comfort with the slots is limited.

SUMMARY OF THE INVENTION

An object of the present invention is to provide a suspension member mounting structure which enables the improvement in controllability and maintains the satisfactory ride comfort with the disposition of cushion mounts.

According to the present invention, there is provided a structure for mounting a suspension member, with which left and right suspension arms each supporting a wheel are connected, on a vehicle body through a front cushion group having at least one cushion mount attached to at least one portion of the suspension member in front of a rotary axis of the wheels and a rear cushion group having at least one cushion mount attached to at least one portion of the suspension member in the rear of the rotary axis of the wheels, wherein each cushion mount of one of the front and rear cushion groups is disposed to have a first hole, through which connecting means extends, extending vertically of the vehicle body and each cushion mount of the other is disposed to have a second hole, through which connecting means extends, extending longitudinally of the vehicle body.

As for the connecting means, use is made of rivets, pins or the like, in addition to bolts and nuts.

When the suspension member receives the yawing force in turning, the lateral rigidity of the at least one cushion mount having the hole, through which the connecting means extends, extending longitudinally of the vehicle body among the cushion mounts attached to the suspension member is increased by the longitudinal shear deformation, so that the lateral rigidity of the whole cushion mounts attached to the suspension member comes to be increased. Thus, the controllability may be improved.

Since the vertical force may be absorbed by the at least one cushion mount having the hole, through which the connecting means extends, extending vertically of the vehicle body, ride comfort may be satisfactorily maintained without being damaged.

BRIEF DESCRIPTION OF THE DRAWINGS

The foregoing and other objects and features of the invention will become apparent from the following description of a preferred embodiment of the invention with reference to the accompanying drawings, in which:

FIG. 7 is a plan view showing the operation of a structure according to the present invention;

FIGS. 9 through 12 are schematic views showing respective prior art suspension member mounting structures, in which FIGS. 9, 11 and 12 are plan views and FIG. 10 is a side view of the prior art structures.

DETAILED DESCRIPTION OF THE PREFERRED EMBODIMENT

Figure 1:
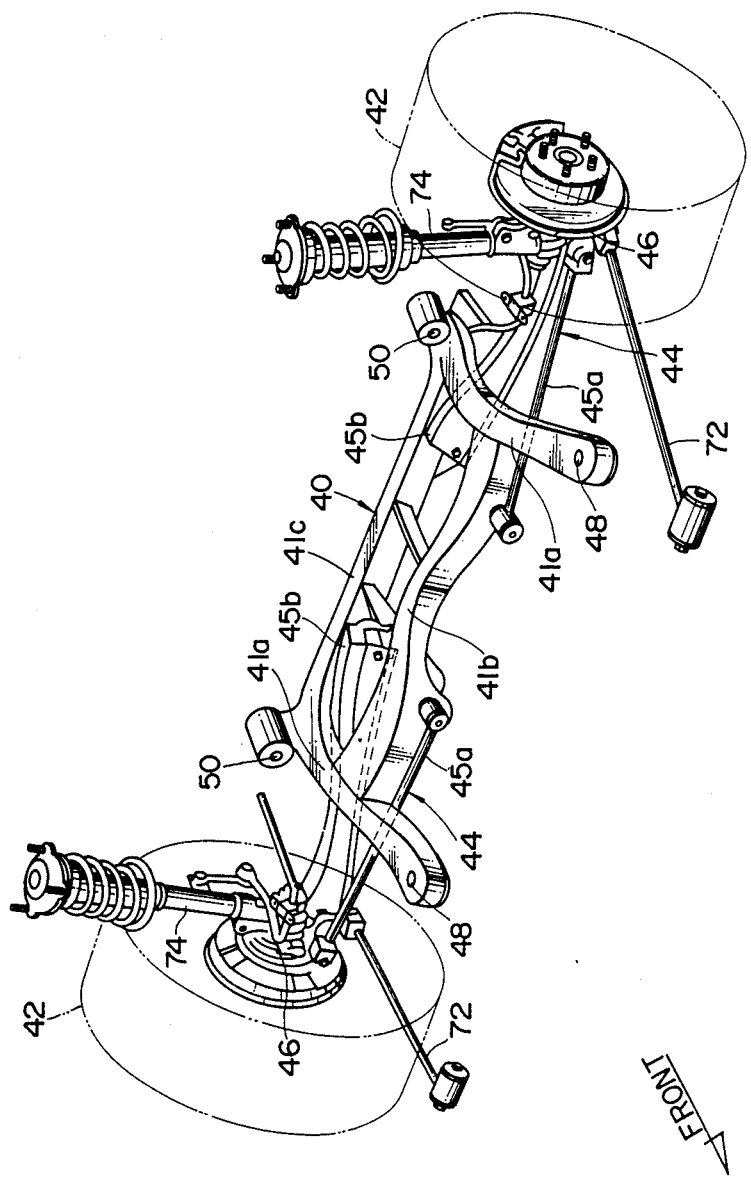
FIG. 1 is a perspective view showing a suspension.
Figure 2:
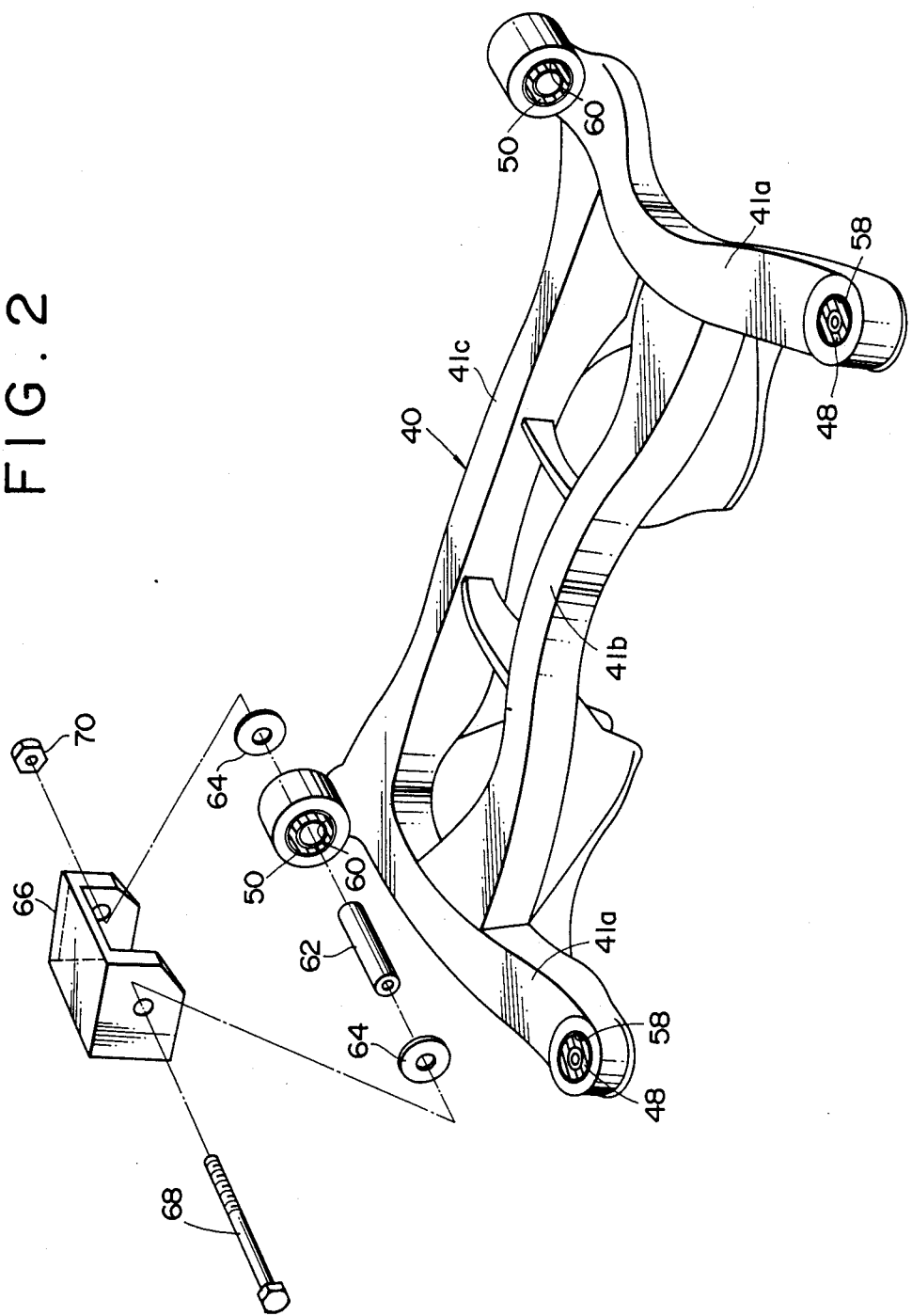
FIG. 2 is a perspective view showing a suspension member.

A mounting structure as shown in FIGS. 1 and 2 is an embodiment, in which a suspension member 40 is mounted on a vehicle body, and applied to a rear suspension.

The suspension member 40 is formed of a pair of side members 41a spaced apart from each other in a lateral direction of the vehicle body and extending in a longitudinal direction of the vehicle body, a cross member 41b extending in the lateral direction from each of approximately central portions of the side members 41a and a cross member 41c extending between the side members 41a and located behind the cross members 41b, all these members being rigidly connected with each other.

Left and right suspension arms 44 each supporting a rear wheel 42 are connected with the suspension member 40. Each of the suspension arms 44 consists of an arm 45a and an arm 45b located behind the arm 45a. The arms 45a,45b are disposed in the lateral direction of the vehicle body, and swingably connected on their inner ends with the cross members 41b,41c of the suspension member 40 while these arms are swingably connected on their outer ends with a wheel carrier 46.

The suspension member 40 is mounted on the vehicle body through a front cushion group having two cushion mounts 48 attached respectively to two corners of the suspension member 40 in front of a rotary axis of the rear wheels 42 and a rear cushion group having two cushion mounts 50 attached respectively to two corners of the suspension member 40 behind the rotary axis of the rear wheels 42.

Figure 3:
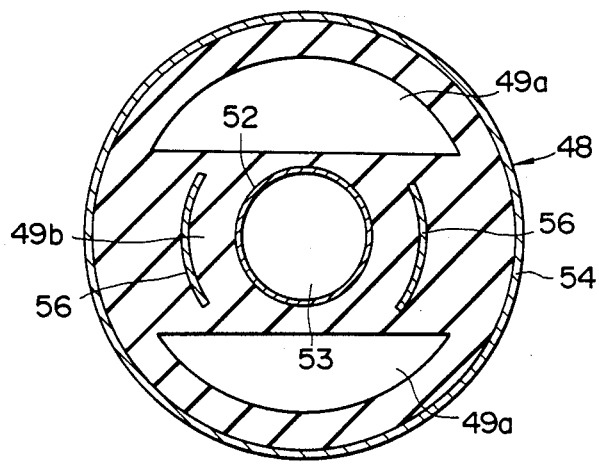
FIG. 3 is a sectional view of a cushion mount taken along a horizontal plane.

Each cushion mount 48 of the front cushion group located in front of the rotary axis of the rear wheels is made of rubber into the form of a cylinder and, as shown in FIG. 3, has inner and outer tubes 52,54 bonded respectively to inner and outer peripheral surfaces. The cushion mount 48 is provided with a pair of slots 49a sandwiching the inner tube 52 and a pair of inserts 56 made of hard material and embedded in a columnar portion 49b having no slot. The cushion mount 48 is attached to the suspension member 40 by press fitting the outer tube 54 into a hole 58 provided vertically in the corner of the suspension member 40 so as to make a first hole 53 in the inner tube 52 arrange vertically and locate the pair of slots 49a in the longitudinal direction of the vehicle body.

Figure 4:
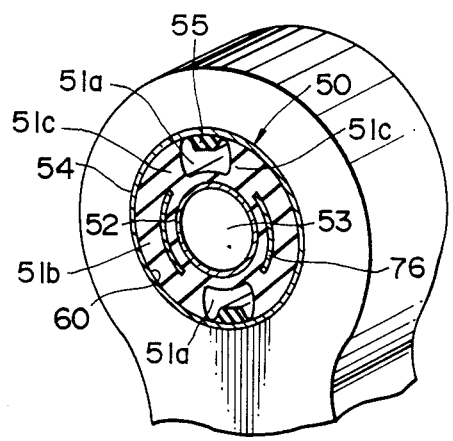
FIG. 4 is a perspective view showing a cushion mount disposed so as to make connecting means extend longitudinally of a vehicle body.

Each cushion mount 50 of the rear cushion group located behind the rotary axis of the rear wheels is made of rubber into the form of a cylinder and, as shown in FIG. 4, has inner and outer tubes 52,54 bonded respectively to the inner and outer peripheral surfaces. The cushion mount 50 is provided with a pair of slots 51a sandwiching the inner tube 52 and a pair of inserts 76 made of hard material and embedded in a columnar portion 51b having no slot. Two compressive deformation portions 51c extending from the columnar portion 51b to the outer tube 54 are provided to be included in the respective slots 51a. A stopper 55 is attached to a position of the outer tube 54 facing to each of the 50 is attached to the suspension member 40 by press fitting the outer tube 54 into a hole 60 provided longitudinally in the corner of the suspension member 40 so as to make a second hole 53 in the inner tube 52 arrange horizontally and locate the pair of slots 51a in the vertical direction.

The suspension member 40 is mounted on the vehicle body by bolts (not shown) extending through the first holes 53 in two front cushion mounts 48 and bolts extending through the second holes 53 in two rear cushion mounts 50. For example, as shown in FIG. 2, each of the rear cushion mounts 50 is mounted to the vehicle body by the steps of inserting a collar 62 into the second hole in each cushion mount 50, applying a pair of rubber stoppers 64 to both ends of the collar 62, inserting a bolt 68 into a bracket 66 of the vehicle body and collar 62 and the threading a nut 70 onto the bolt 68.

A suspension is so constituted that each of radius rods 72 is extended between corresponding one of wheel carriers 46 and the vehicle body and each of struts 74 is disposed between the corresponding one of wheel carriers 46 and the vehicle body.

Figure 6A:
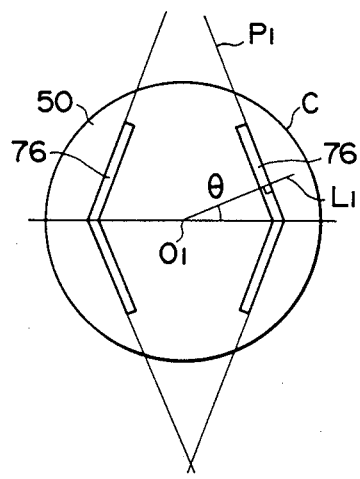
FIGS. 6a, 6b are schematic diagrams showing inserts embedded in the cushion mount disposed so as to make the connecting means extend longitudinally of the vehicle body.
Figure 6B:
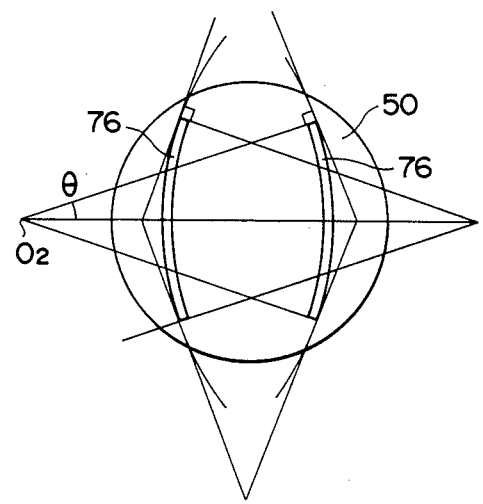
Figure 8:
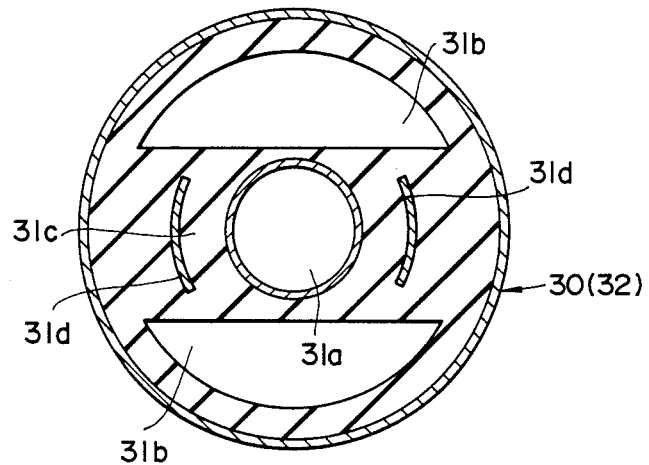
FIG. 8 is a sectional view of a prior art cushion mount taken along a horizontal plane.
Figure 9:
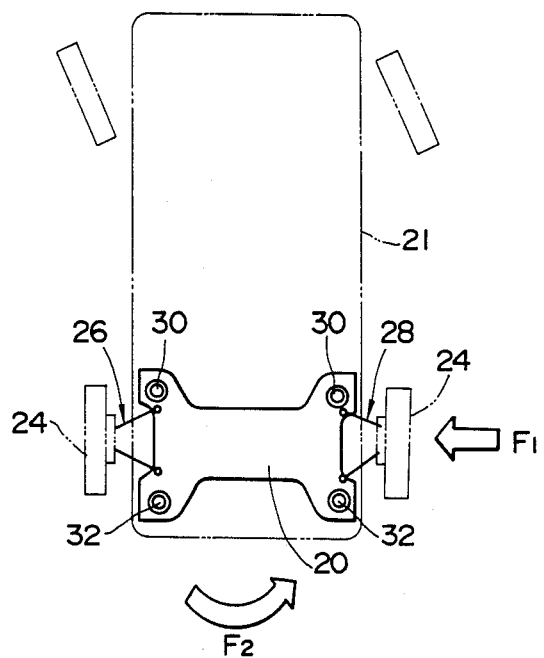
Figure 10:
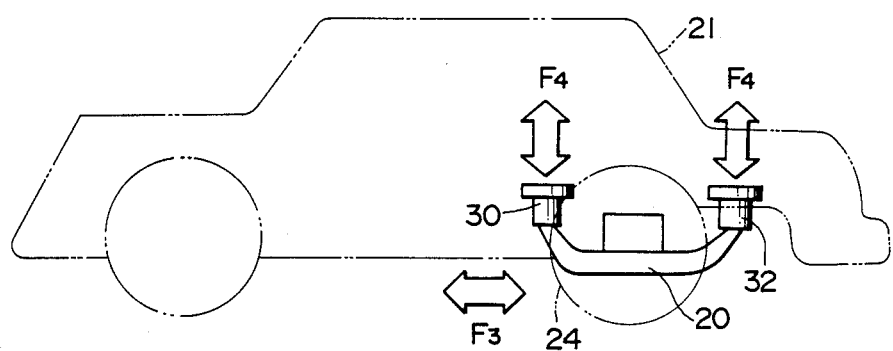

As shown in FIG. 6, each insert 76 embedded in the cushion mount 50 is formed into a bent plate-like shape (FIG. 6a) or arcuate shape (FIG. 6b). In the former, it is preferable to determine the bending angle of each insert 76 such that a line $L_1$ passing through the center $O_1$ of an outer circumference C of the cushion mount 50 and making an angle $\theta$ with a horizontal plane including the diameter of the cushion mount 50 is orthogonal to a plane $P_1$ of the insert 76. Also, in the latter, it is preferable to be arcuate each insert 76 into an arc having the center $O_2$ in which normals at both ends of the insert 76 cross each other at an angle $\theta$ with respect to the horizontal plane. Thus, the insert is located so as to be approximately orthogonal to the component of inertia force of a sprung mass received by the cushion mount 50 within a turning limit region, so that the rigidity of the cushion mount 50 may be improved.

Two inserts 76 provided in the cushion mount 50 shown in FIG. 6 are symmetrical with respect to a vertical plane in order to give the interchangeability, and also symmetrical with respect to a horizontal plane in order to improve the rigidity against lateral force such as external disturbance entering a usual suspension.

Figure 5:
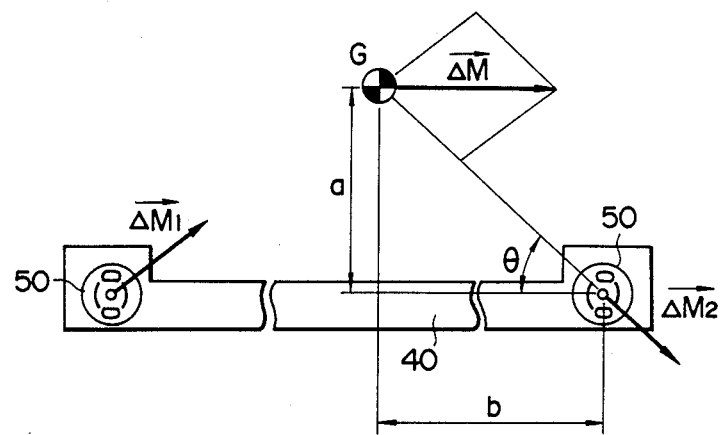
FIG. 5 is a schematic diagram showing vectorially each force generated in a turn limit region.

As shown in FIG. 5, assuming that a vertical distance between the center G of gravity of a vehicle and the cushion mount 50 is a and a lateral distance between the center G of gravity of the vehicle and one cushion mount 50 is b, the angle $\theta$ as noted above is given by tan $\theta = a/b$.

For example, when the vehicle turns left, a load displacement occurs from a left tire to a right one. As the turning speed is increased, rolling reaches to a limit and the load displacement as noted above is successively lessened to be eventually liable to occur a lateral slip phenomenon of the tire. In this state, when force is further applied in the rolling direction by the operation of a steering wheel, force shown in FIG. 5 acts on the suspension member 40. This force will be represented by a vector as follows;

$$\vec{\Delta M} = \vec{\Delta M_1} + \vec{\Delta M_2},$$

where $\Delta M$ represents a vector of inertia force of a sprung mass, $\Delta M_1$ represents a vector of force applied to the cushion mount disposed on the rear left side of the suspension member and $\Delta M_2$ represents a vector of force applied to the cushion mount disposed on the rear right side of the suspension member. Each insert 76 defined as shown in FIG. 6 will come to be orthogonal approximately to the force applied to the cushion mount.

The embodiment as noted above relates to a rear suspension and the cushion mounts 48,50 are arranged such that the vehicle will, when turning, have an understeer characteristic/property. For example, when the travelling vehicle turns left, lateral force $F_1$ and yawing force $F_2$ act on the suspension member 40 as shown in FIG. 7 and the lateral force and torsional force are applied to the cushion mounts 48, 50. Then, since the lateral rigidities of the cushion mounts 50 attached to the suspension member 40 and located behind the rotary axis of the rear wheels 42 so as to set the connecting means longitudinally of the vehicle body is larger than the lateral rigidities of the cushion mounts 48 located in front of the rotary axis, the suspension member 40 is set to the $F_5$-steered condition, centering around the rear cushion mount 50, so that the vehicle property may be brought to the under-steer.

The present invention may be applied to a front suspension, in which the suspension arms each supporting a front wheel are connected with the suspension member and this suspension member is mounted on the vehicle body through the cushion mounts. Also in this case, the cushion mounts are arranged such that the vehicle will, when turning, have an understeer characteristic/property. By so doing, the cushion mounts on positions of the suspension member in front of a rotary axis of the front wheels may be disposed so as to extend each of the second holes, through which the connecting means extends, longitudinally of the vehicle body, while the cushion mounts on positions of the suspension member behind the rotary axis of the front wheels may be disposed so as to extend each of the first holes, through which the connecting means extends, vertically of the vehicle body, and thereby the vehicle property becomes under-steer.

Figure 11:
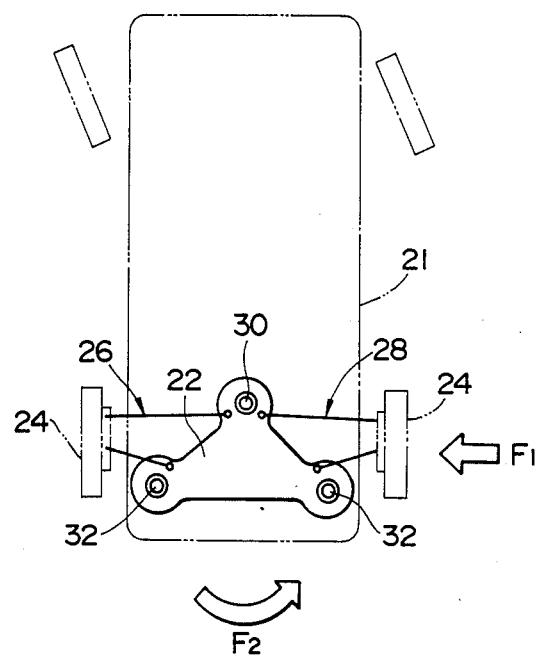
Figure 12:
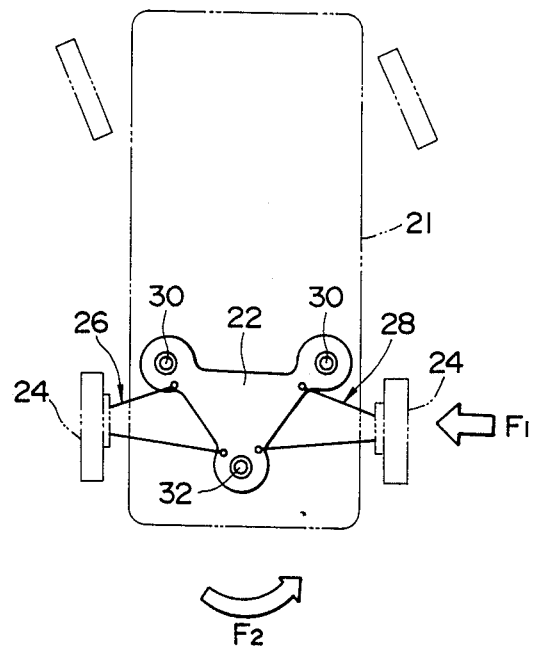

Even when a suspension member is mounted on a vehicle body through three cushion mounts as shown in FIGS. 11 and 12, the cushion mounts may be arranged according to the foregoing way. Namely, in the case of a rear suspension, the cushion mount or cushion mounts on a position or positions of the suspension member behind the rotary axis of the rear wheels is disposed so as to extend the second hole, through which the connecting means extends, longitudinally of the vehicle body, while in the case of a front suspension, the cushion mount or cushion mounts on a position or positions of the suspension member in front of the rotary axis of the front wheels is disposed so as to extend the second hole, through which the connecting means extends, longitudinally of the vehicle body and other cushion mounts are disposed so as to extend the first hole, through which the connecting means extends, vertically.

Further, in the embodiment as noted above, each of the cushion mounts 50 having the second hole, through which the connecting means extends, extending longitudinally of the vehicle body reduces the vertical rigidity by locating the slots 49a vertically. Instead, the vertical rigidity may be reduced by thickening upper and lower portions of the cushion mount 50 located vertically.

What is claimed is:

1. A suspension member mounting structure for mounting on a vehicle body a suspension member, with which left and right suspension arms each supporting a wheel are connected, through a front cushion group having at least one cushion mount attached to at least one position of said suspension member in front of a rotary axis of said wheels and a rear cushion group having at least one cushion mount attached to at least one position of said suspension member behind the rotary axis of said wheels, wherein each cushion mount of one of said front and rear cushion groups is disposed to have a first hole, through which connecting means extends, extending vertically of the vehicle body and each cushion mount of the other is disposed to have a second hole, through which connecting means extends, extending longitudinally of said vehicle body and wherein said cushion mounts are arranged such that the vehicle will, when turning, have an understeer characteristic by setting the suspension member to a steered condition centering around the cushion mount having said second hole.

2. A suspension member mounting structure as claimed in claim 1, wherein said front cushion group includes two cushion mounts and said rear cushion group includes two cushion mounts.

3. A suspension member mounting structure as claimed in claim 1, wherein one of said front and rear cushion groups includes a cushion mount and the other includes two cushion mounts.

4. A suspension member mounting structure for mounting on a vehicle body a suspension member, with which left and right suspension arms each supporting a wheel are connected, through a front cushion group having at least one cushion mount attached to at least one position of said suspension member in front of a rotary axis of said wheels and a rear cushion group having at least one cushion mount attached to at least one position of said suspension member behind the rotary axis of said wheels, wherein each cushion mount of one of said front and rear cushion groups is disposed to have a first hole, through which connecting means extends, extending vertically of the vehicle body and each cushion mount of the other is disposed to have a second hole, through which connecting means extends, extending longitudinally of said vehicle body, wherein each cushion mount of one of said front and rear cushion groups, the cushion mount having the hole extending longitudinally of the vehicle body, has a pair of inserts disposed laterally of the vehicle body so as to sandwich the hole, each of the inserts being formed into a shape selected from a bent plate-like shape and an arcuate shape.

5. A suspension member mounting structure as claimed in claim 4, wherein said each insert is formed so as to be approximately orthogonal to the component of inertia force of a sprung mass received by the cushion mount within a turning limit region.

6. A suspension member mounting structure as claimed in claim 5, wherein said inserts are symmetrical with respect to a vertical plane and a horizontal plane.

7. A suspension member mounting structure for mounting on a vehicle body a suspension member, with which left and right suspension arms each supporting a wheel are connected, through a front cushion group having two cushion mounts attached to two positions of said suspension member in front of a rotary axis of the wheels and a rear cushion group having two cushion mounts attached to two positions of said suspension member behind the rotary axis of the wheels, wherein each cushion mount of one of the front and rear cushion groups is disposed to have a hole, through which connecting means extends, extending vertically of the vehicle body and each cushion mount of the other is disposed to have a hole, through which connecting means extends, extending longitudinally of the vehicle body, and wherein said cushion mounts are arranged such that the vehicle will, when turning, have an understeer characteristic.

8. A suspension member mounting structure for mounting on a vehicle body a suspension member, with which left and right suspension arms each supporting a wheel are connected, through a front cushion group having at least one cushion mount attached to at least one position of said suspension member in front of a rotary axis of said wheels and a rear cushion group having at least one cushion mount attached to at least one position of said suspension member behind the rotary axis of said wheels, wherein each cushion mount of one of said front and rear cushion groups is disposed to have a first hole, through which connecting means extends, extending vertically of the vehicle body and is provided with a pair of slots sandwiching the first hole, the pair of slots being located in the longitudinal direction of the vehicle body, and wherein each cushion mount of the other is disposed to have a second hole, through which connecting means extends, extending longitudinally of said vehicle body and is provided with a pair of slots sandwiching the second hole, the pair of slots being located in the vertical direction.

* * * * *